Patented Mar. 2, 1937

2,072,252

UNITED STATES PATENT OFFICE 2,072,252

COLORING TEXTILE MATERIAL

George Holland Ellis, Spondon, near Derby, England, assignor to Celanese Corporation of America, a corporation of Delaware No Drawing. Application February 25, 1933, Serial No. 658,670. In Great Britain March 12, 1932

8 Claims. (Cl. 8—5)

This invention relates to the coloration of materials consisting of or containing cellulose acetate or other cellulose esters or ethers.

I have found that disazo dyes of the general formula

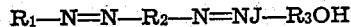
$$R_1-N=N-R_2-N=N-R_3OH$$

in which $R_1$, $R_2$ and $R_3$ are residues of the benzene series, are of particular value, especially when unsulphonated, for the coloration of cellulose acetate and other cellulose ester or ether materials. Thus, the dyestuff benzene-azo-benzene-azo-phenol yields on the aforesaid materials golden yellow shades of exceptional properties. For example these yellow shades are very fast to light and washing. Moreover they are very resistant to steaming and are therefore of especial value for application by printing or for application to pile fabrics or other materials which may subsequently be called upon to resist a steaming treatment. Again, this dyestuff is resistant to the action of nitrous acid, a property frequently of value when it is desired to use it in the production of compound shades, one of the component coloring matters being produced by azoic methods on the material. Further, these golden yellow shades although of outstanding fastness properties are yet readily dischargeable, for example by means of zinc formaldehyde sulphoxylate or by means of stannous salt discharges.

Similarly, valuable shades may be obtained by means of other dyestuffs of the above-mentioned general formula, especially such dyestuffs as do not contain auxochromic salt forming groups or chromophoric groups other than the two azo groups and the phenolic hydroxyl group, and particularly such dyestuffs containing no nitro substituents. Of particular value in general are those dyestuffs in which the hydroxyl group in the nucleus $R_3$ is in the para-position to the azo linkage. As examples of substituents which may be present in one or more of the residues $R_1$, $R_2$ and $R_3$ mention may be made of alkyl groups, methoxy or other alkoxy groups and chlorine or other halogen atoms.

The dyestuffs may be manufactured in any desired way. In general they are very conveniently obtained by diazotizing amino-azo compounds of the benzene series and coupling with phenolic coupling components of the benzene series, preferably such coupling components as couple in the para-position to the hydroxyl group. Thus, the above-mentioned benzene-azo-benzene-azo-phenol may very readily be obtained by coupling diazotized amino-azo-benzene with phenol. Instead of phenol substituted phenols may be employed, for example ortho- or meta-cresol.

In a similar way other azo dyestuffs of the above mentioned general formula may be prepared by coupling diazo compounds derived from other amino-azo compounds with phenol or substituted phenols, particularly such as couple in the para-position to the hydroxyl group. Such amino-azo compounds may for instance be amino azo toluene and those obtainable by coupling diazotized aniline, chlor-anilines, toluidines, xylidines, anisidines or phenetidines with middle components of the benzene series, for example meta-toluidine, para-xylidine or 3-amino-4-methoxy-1-methyl-benzene.

The new coloring matters, as indicated above, are of especial value for the coloration of cellulose acetate and other cellulose ester or ether materials. As examples of such other esters and ethers reference may be made to cellulose formate, propionate or butyrate or the products obtainable by treating alkalized cellulose with esterifying agents, or the ethyl, benzyl or other ethers of cellulose. They may also be applied to mixed materials comprising one or more of the aforesaid cellulose esters or ethers in admixture with other textile fibres, for example wool, silk or other animal fibres, or cotton, regenerated cellulose or other cellulosic materials. Such other fibres may be colored by the same dyestuffs as the cellulose esters or ethers when they possess the requisite affinity, or they may be colored either in the same or different shades by means of other dyestuffs, either before, after or simultaneously with the coloration of the cellulose esters or ethers.

The coloring matters may be applied to the materials in solution where sufficiently soluble, in aqueous suspension, or after being brought into colloidal form.

For convenience in application, the new coloring matters may be converted into concentrated or other preparations, whether liquid or solid or semi-solid, in which the coloring matters are present in colloidal, dispersed, or other finely divided condition. Such preparations are included within the scope of the invention and may be prepared for example, by grinding (e. g. in colloid mills), by dissolving in a solvent and mixing with water containing or not containing protective colloids and/or dispersators, or by treatment with dispersing agents whether alone or in the presence of protective colloids and/or liquids, e. g. water.

As examples of dispersing agents or protective colloids mention may be made of the following:—

Sulphoaromatic fatty acid compounds, e. g. sulphobenzene palmitic acid compounds (see U. S. Patent No. 1,694,413).

Sulphoaromatic ricinoleic acid compounds, e. g. suphonaphthalene-ricinoleic acid, (see U. S. Patent No. 1,840,572).

Naphthenic acids or other carbocyclic compounds containing salt-forming groups or salts of such acids or compounds (see U. S. Patent No. 1,618,414).

Sulphonated oil compounds, e. g. sulphonated castor oil.

Sulphuric esters of higher aliphatic alcohols.

Furfural-naphthalene sulphonic acid compounds (see U. S. application S. No. 390,423 filed 4th September, 1929). Patent No. 1,928,647, of October 3, 1933.

Resino-naphthalene sulphonic acid compounds (see U. S. application S. No. 390,424 filed 4th September, 1929). Patent No. 1,959,352, of May 22, 1934.

Formaldehyde naphthalene sulphonic acid compounds.

Alkyl-, cycloalkyl-, and aralkyl-naphthalene sulphonic acids.

Sulphite cellulose waste liquor or its constituents or products of transformation, e. g. lignin sulphonic acid compounds.

Sulphonic acid compounds of mineral oils, tar oils, brown coal tar oils, and the like, and their products of condensation with alcohols.

Sulphonic acid compounds of distillation residues of benzaldehyde.

Carbohydrates including gums.

Glue and gelatine.

By addition of or dilution with water, the aforesaid preparations containing unsulphonated coloring matters yield aqueous suspensions or colloidal solutions which may be directly employed for the coloration of cellulose acetate or other organic substitution derivatives of cellulose.

The coloring matters may be applied to the materials in any convenient manner, for example by dyeing, padding or other method of uniform application, or by printing, stencilling or other mode of local application.

The invention is illustrated but not limited by the following examples:—

*Example 1*

2 kgs. of amino-azo-benzene are mixed with 3.5 litres of hydrochloric acid of 28 per cent. strength, and about 10 litres of water, until fine suspension is obtained. About 15 kgs. of ice are then added and the whole stirred at 0 to 5° for about one hour, during which time a solution of 720 grams of sodium nitrite in a little water is slowly added. After stirring for a time until diazotization is complete, the solution is allowed to settle and the clear liquid run into an aqueous solution made from 940 grams of phenol, 400 grams of caustic soda and 700 grams of sodium carbonate. The resulting dyestuff is filtered off and washed.

For the dyeing of cellulose acetate the dyestuff may be dispersed with the aid of Turkey red oil and applied to the material from a soap bath. In this way golden yellow shades of exceptional fastness may be produced.

*Example 2*

230 grams of finely divided amino-azo-toluene are mixed with 350 ccs. of hydrochloric acid of 28% strength and 2-3 litres of ice water. A solution of 72 grams of sodium nitrite is then run in and the mixture stirred until diazotization is complete. The mixture is then allowed to settle and the clear diazo solution run into a solution of 108 grams of para cresol in 1 litre of water containing 40 grams of caustic soda and 70 grams of sodium carbonate. The dyestuff produced is separated by filtration and washed with water. Cellulose acetate materials dyed with this dyestuff by dispersion methods exhibit a shade which is redder than that given by the dyestuff obtained by coupling diazotized amino-azo-benzene with phenol.

*Example 3*

Para-anisidine is diazotized in aqueous solution and coupled with para-xylidine to form the amino-azo compound 4-methoxy-benzene-azo-4-amino-2:5-dimethyl-benzene. After separation and purification this compound is further diazotized in aqueous medium and coupled in alkaline solution with ortho-cresol. The resultant diazo dyestuff has an excellent affinity for cellulose ester and ether materials, and may be applied to them by dispersion methods.

*Example 4*

The dyestuff prepared in accordance with the method described in Example 1 is incorporated in a printing paste having the following composition:—

| | Parts |
|---|---|
| Dyestuff 20% aqueous paste | 10 |
| Diethylene glycol (or alcohol) | 10 |
| Gum arabic and water thickening | 80 |
| | 100 | and the paste applied by printing or stencilling to a cellulose acetate woven fabric. The goods are then dried, steamed or aged and washed to remove thickening and the like, and dried and finished as desirable or requisite. A fine golden yellow print of excellent fastness to light is obtained.

*Example 5*

100 kilos of a "pile" fabric, such for example as a plush fabric, the pile of which consists of cellulose acetate yarn and the back of cotton yarn, is entered into a dyebath containing a dispersion of 1 kilo of the dyestuff prepared in accordance with the method described in Example 2 dispersed with the aid of Turkey red oil or other dispersing agent with or without an auxiliary solvent such for example as xylene. The dyeing is conducted with a rise in temperature. When the desired shade is achieved, the goods are removed, washed and dried. By incorporating a suitable cotton color in the dyebath, or by dyeing with a cotton dyestuff from a fresh dyebath, the cotton back of the material may be dyed in a similar or contrasting shade.

The coloration of the pile of the fabric is very fast to steaming, and the pile fabric may be subjected to any steaming operation necessary in the finishing manipulation for this class of material, without loss of shade.

*Example 6*

A woven fabric consisting of cellulose acetate is dyed by dispersion methods with 5% on the weight of the goods of a 10% aqueous paste of para-amino-benzene-azo-dimethyl-aniline. The goods are then washed and entered at below 20 C.

into a 30:1 bath containing 3 grams per litre of sodium nitrite and 14½ ccs. per litre of hydrochloric acid of 28° Tw. When diazotization is complete, i. e. after from ½ to ¾ hour, the material is washed and entered cold into a 30:1 bath made up by dissolving 1.5% β-oxy-naphthoic acid on the weight of the goods in water containing 0.4% of caustic soda and acidifying by cautious addition of the requisite quantity of formic acid, preferably with the addition of glue as the protective colloid. The temperature is now raised slowly to 50° to 60° C. and maintained thereat until development is complete, when the fabric is washed.

The navy blue dyed material is then entered into a fresh bath containing 3.5% of a 10% aqueous paste of the dyestuff obtained in accordance with the method described in Example 1 and left there until the color has deepened to a fine black shade. The fabric is then washed and dried. Where pattern effects are desired the material may now be printed with a printing paste containing:—

| | Parts by weight |
|---|---|
| Decrolin sol. conc. (I. G.) | 25 |
| Diethylene glycol (or alcohol) | 10 |
| Ethyl lactate | 10 |
| Gum arabic thickening | 55 |
| | 100 | dried, aged or steamed as desirable or requisite, washed and finished, when an excellent white discharge is obtained. Where colored pattern effects are desired the printing paste may be illuminated with dyestuffs resistant to decrolin.

While the invention has been described in connection with the production of colorations on cellulose ester and ether materials more particularly with regard to the application of the disazo dyestuffs of the invention in substance to the materials, the materials may also, though less advantageously, be colored by producing these dyestuffs on the material. Thus for example a cellulose acetate fabric may be dyed with an amino-azo compound of the benzene series and the latter diazotized and coupled on the material with a phenolic coupling component. Alternatively the phenolic coupling component may be applied first and developed with a diazotized amino azo compound.

What I claim and desire to secure by Letters Patent is:—

1. Process for the production of colorations on materials comprising an organic derivative of cellulose, comprising applying in substance to the materials compounds having the general formula $$R_1—N{=}N—R_2—N{=}N—R_3OH$$

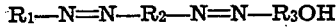

in which $R_1$, $R_2$ and $R_3$ are residues of the benzene series each containing a single benzene nucleus, the azo groups being the sole chromophores and the hydroxyl group the sole salt-forming auxochrome, said compounds being free from carboxylic and sulphonic acid groupings.

2. Process for the coloration of materials comprising an organic derivative of cellulose, comprising applying in substance to the materials benzene-azo-benzene-azo-phenol of the formula

3. Process for the production of colorations on materials comprising cellulose acetate, comprising applying in substance to the materials compounds having the general formula $$R_1—N{=}N—R_2—N{=}N—R_3OH$$

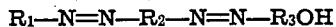

in which $R_1$, $R_2$ and $R_3$ are residues of the benzene series each containing a single benzene nucleus, the azo groups being the sole chromophores and the hydroxyl group the sole salt-forming auxochrome, said compounds being free from carboxylic and sulphonic acid groupings.

4. Process for the production of colorations on materials of cellulose acetate, which comprises applying in substance to the materials a compound having the general formula $$R_1—N{=}N—R_2—N{=}N—R_3OH$$

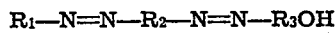

in which $R_1$, $R_2$ and $R_3$ are residues of the benzene series each containing a single benzene nucleus, said compounds being substituted only by substituents selected from the group consisting of alkyl, alkoxy and halogen, and by the hydroxyl group attached to the grouping $R_3$.

5. Process for the production of colorations on materials of cellulose acetate, which comprises applying in substance to the materials a compound having the general formula $$R_1—N{=}N—R_2—N{=}N—R_3OH$$

in which $R_1$, $R_2$ and $R_3$ are residues of the benzene series each containing a single benzene nucleus, and wherein the hydroxyl group attached to the grouping $R_3$ is the sole substituent.

6. Process for the coloration of materials comprising an organic derivative of cellulose, comprising applying in substance to the materials a compound selected from the group of benzene-azo-benzene-azo-ortho-cresol and benzene-azo-benzene-azo-meta-cresol.

7. Process for the coloration of materials comprising cellulose acetate, comprising applying in substance to the materials benzene-azo-benzene-azo-phenol of the formula

8. Process for the coloration of materials comprising cellulose acetate, comprising applying in substance to the materials a substance selected from the group of benzene-azo-benzene-azo-ortho-cresol and benzene-azo-benzene-azo-meta-cresol.

GEORGE HOLLAND ELLIS.

CERTIFICATE OF CORRECTION.

Patent No. 2,072,252.　　　　　　　　　　　　　　　　　　　　　March 2, 1937.

GEORGE HOLLAND ELLIS.

It is hereby certified that error appears in the printed specification of the above numbered patent requiring correction as follows: Page 1, first column, line 6, in the formula, for "NJ" read N; and that the said Letters Patent should be read with this correction therein that the same may conform to the record of the case in the Patent Office.

Signed and sealed this 30th day of March, A. D. 1937.

(Seal)　　　　　　　　　　　　　　　　　　　　　　Henry Van Arsdale
　　　　　　　　　　　　　　　　　　　　　　　Acting Commissioner of Patents.